Figures 1A, 1B, 1C:
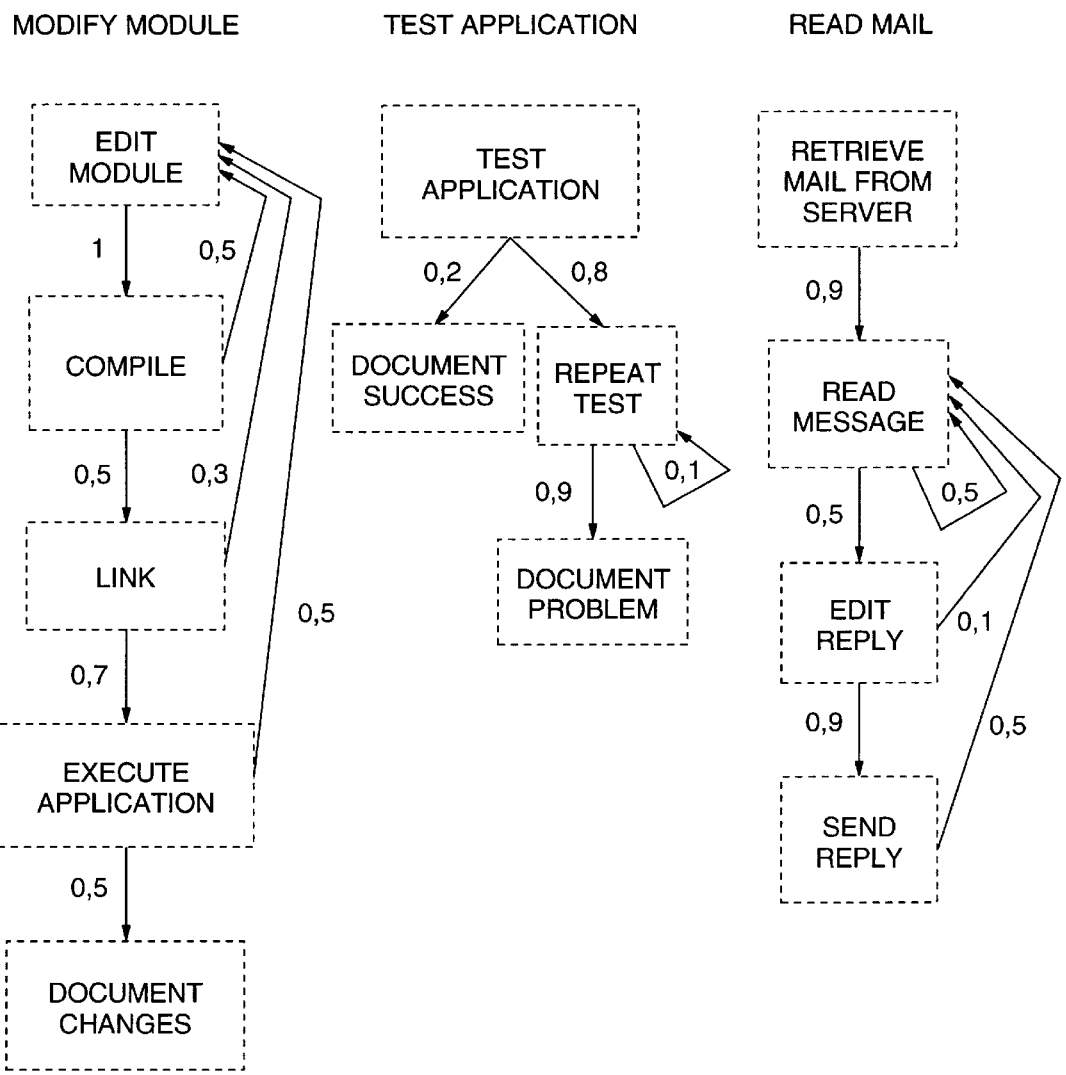

United States Patent [19]
Preining et al.

[11] Patent Number: 5,958,003
[45] Date of Patent: Sep. 28, 1999

[54] METHOD AND COMPUTER SYSTEM FOR IMPROVING THE RESPONSE TIME OF A COMPUTER SYSTEM TO A USER REQUEST

[75] Inventors: Stephan Preining; Michael Cadek, both of Vienna, Austria

[73] Assignee: International Business Machines Corporation, Armonk, N.Y.

[21] Appl. No.: 08/930,165

[22] PCT Filed: Feb. 21, 1996

[86] PCT No.: PCT/EP96/00708

§ 371 Date: Oct. 6, 1997

§ 102(e) Date: Oct. 6, 1997

[87] PCT Pub. No.: WO97/31313

PCT Pub. Date: Aug. 28, 1997

[51] Int. Cl.$^6$ .................................................. G06F 17/00
[52] U.S. Cl. ............................................................ 709/100
[58] Field of Search ........................ 395/200.33, 200.49, 395/670, 674, 672, 673

[56] References Cited

U.S. PATENT DOCUMENTS

| | | | |
|---|---|---|---|
| 5,247,677 | 9/1993 | Welland et al. | 395/650 |
| 5,619,695 | 4/1997 | Arbabi et al. | 395/674 |
| 5,784,616 | 7/1998 | Horvitz | 395/672 |

OTHER PUBLICATIONS

Tanenbaum; "Operating Systems Design and Implementation"; pp. 84–87, 1987.

*Primary Examiner*—Ellis B. Ramirez
*Attorney, Agent, or Firm*—Arthur J. Samodovitz

[57] ABSTRACT

The present invention relates to the technical field of computer systems with improved response time to a user request in a computer session. More particular, the present invention provides improved response time for a client/server- configuration of Personal Computers in a network as well as for stand-alone computer systems.

The inventive concepts provide a 'Services Supercharger' layer of programs and information tables, exploiting the capability to start many tasks in parallel, to prepare the execution environment for one or more user sessions and actions within such user sessions, and after session termination, performs epilogue actions only when appropriate.

The described concepts realize a solution where the possibility of executing multiple tasks in parallel in a system like OS/2 can be exploited to reduce the response time for individual user requests against the system considerably. These concepts can be applied to stand-alone user workstations and in client/server environments.

15 Claims, 11 Drawing Sheets

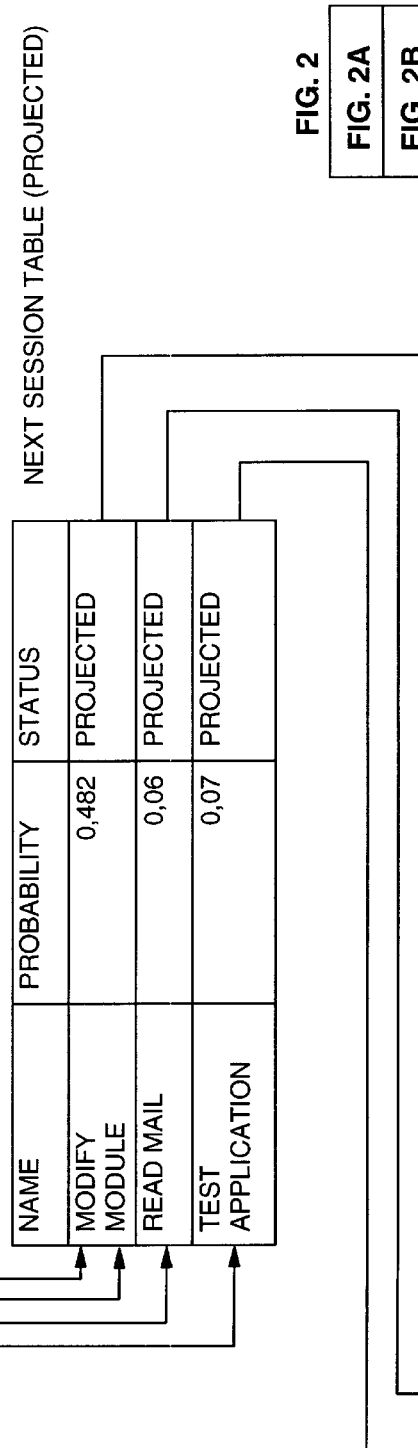

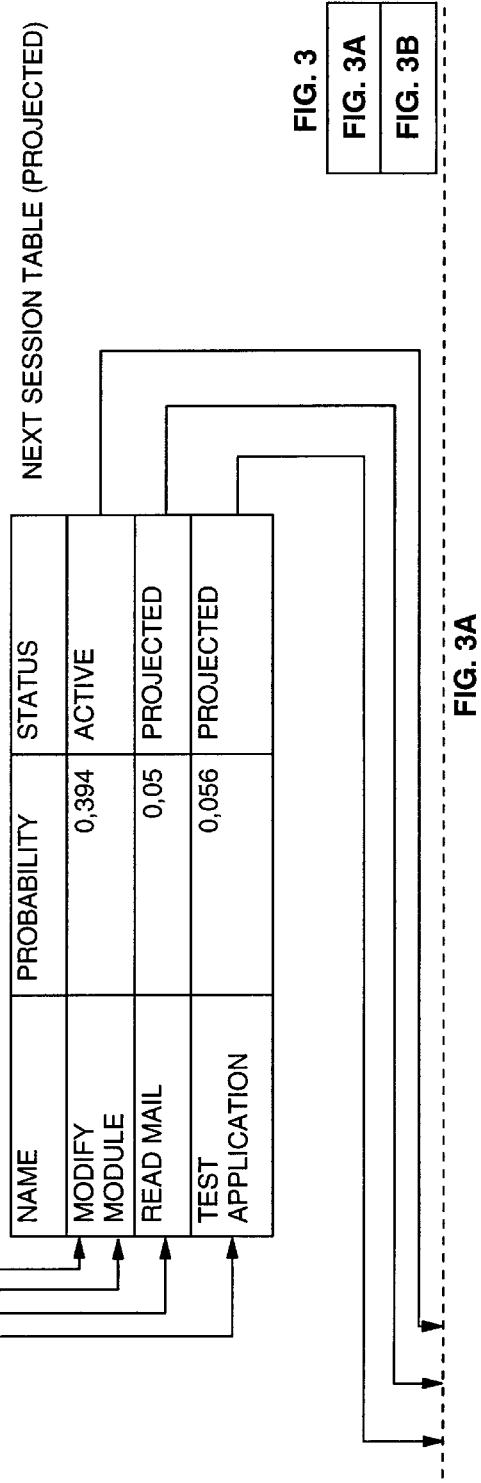

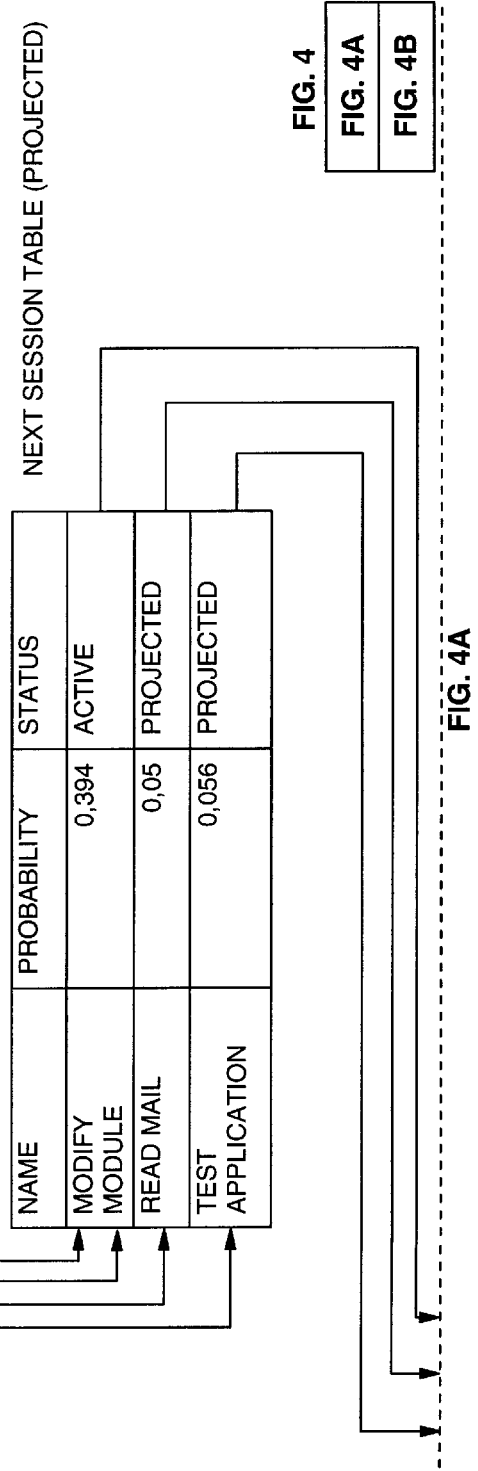

NEXT MINI TASK TABLE (ACTIVE & PROJECTED)

| NAME | PROBABILITY | PROLOGUE | EPILOGUE | SHARED RESOURCES |
|---|---|---|---|---|
| EDIT MODULE | 0 | 1 | 1 | A |
| COMPILE | 0 | 7 | 7 | B |
| LINK | 1 | 7 | 7 | B |
| EXECUTE APPLICATION | 0,7 | 3 | 3 | C, B |
| DOCUMENT CHANGES | 0,35 | 1 | 1 | A |

| NAME | PROBABILITY | PROLOGUE | EPILOGUE | SHARED RESOURCES |
|---|---|---|---|---|
| RETRIEVE NEW MAIL | 1 | 4 | 1 | D |
| READ MESSAGE | 0,9 | 1 | 1 | E |
| EDIT REPLY | 0,45 | 1 | 1 | A |
| SEND REPLY | 0,405 | 4 | 1 | D |

| NAME | PROBABILITY | PROLOGUE | EPILOGUE | SHARED RESOURCES |
|---|---|---|---|---|
| EXECUTE APPLICATION | 1 | 3 | 3 | C, B |
| REPEAT TEST | 0,8 | 3 | 3 | C, B |
| DOCUMENT SUCCESS | 0,2 | 1 | 1 | A |
| DOCUMENT PROBLEM | 0,72 | 1 | 1 | A |

USED RESOURCES: 90
AVAILABLE RESOURCES: 10
SHARED RESOURCES: A, B

FIG. 4B

Figure 5B:
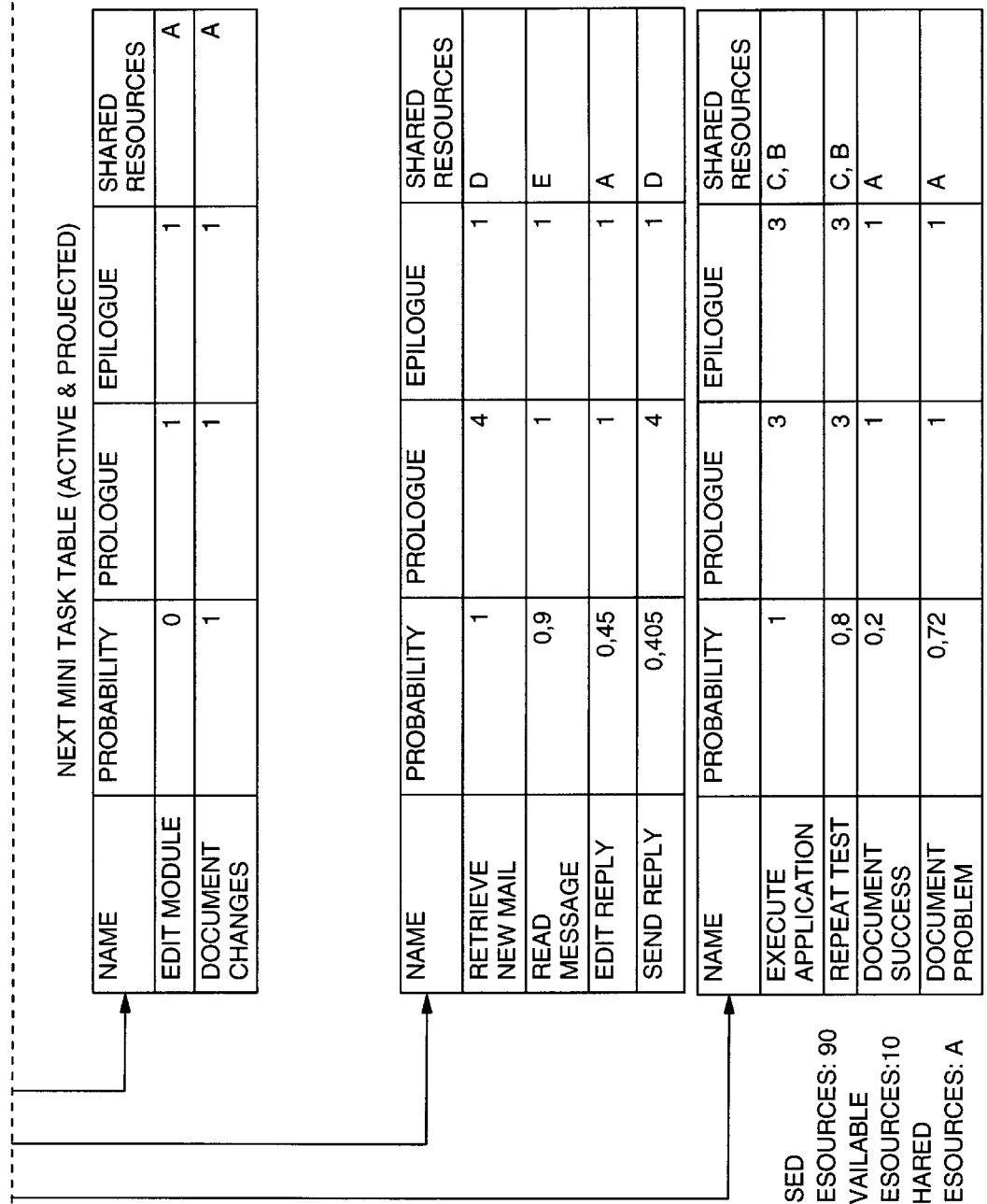

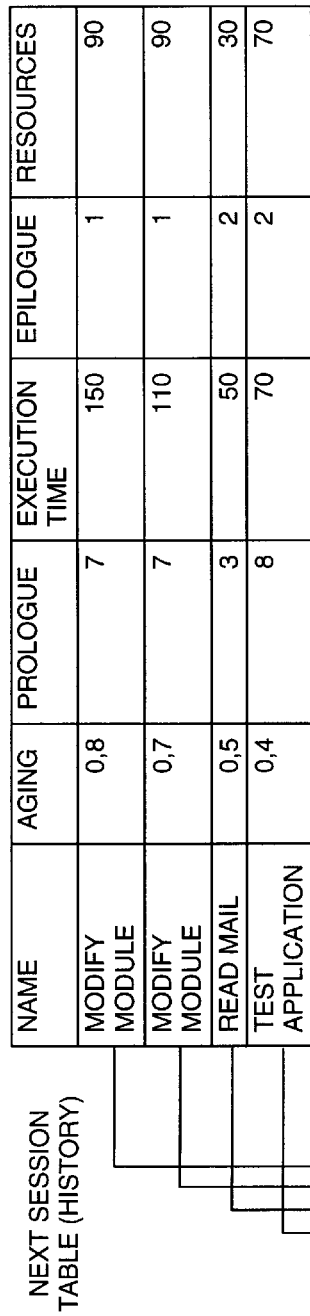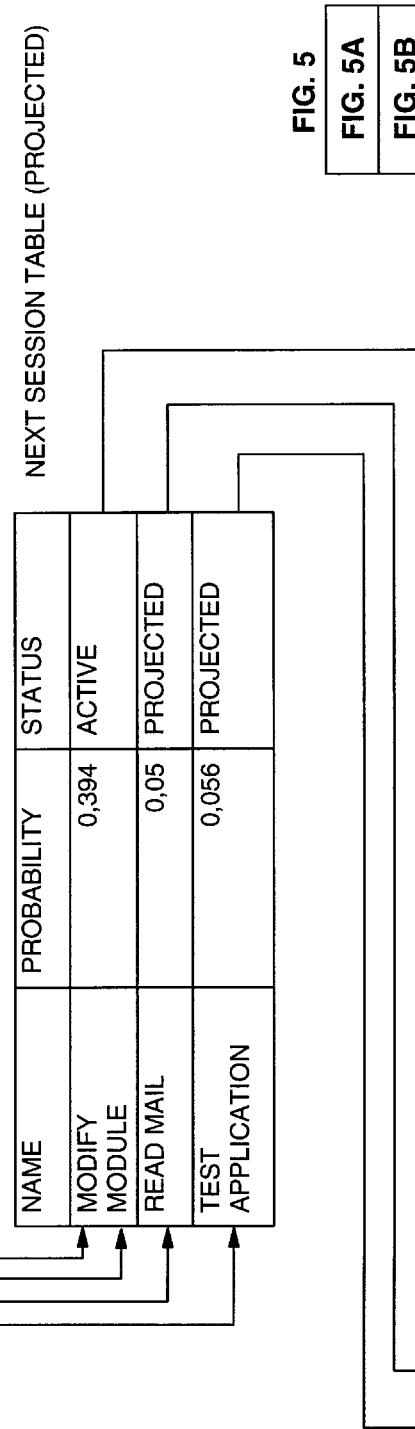
FIG. 5A
FIG. 5
| FIG. 5A |
|---------|
| FIG. 5B |

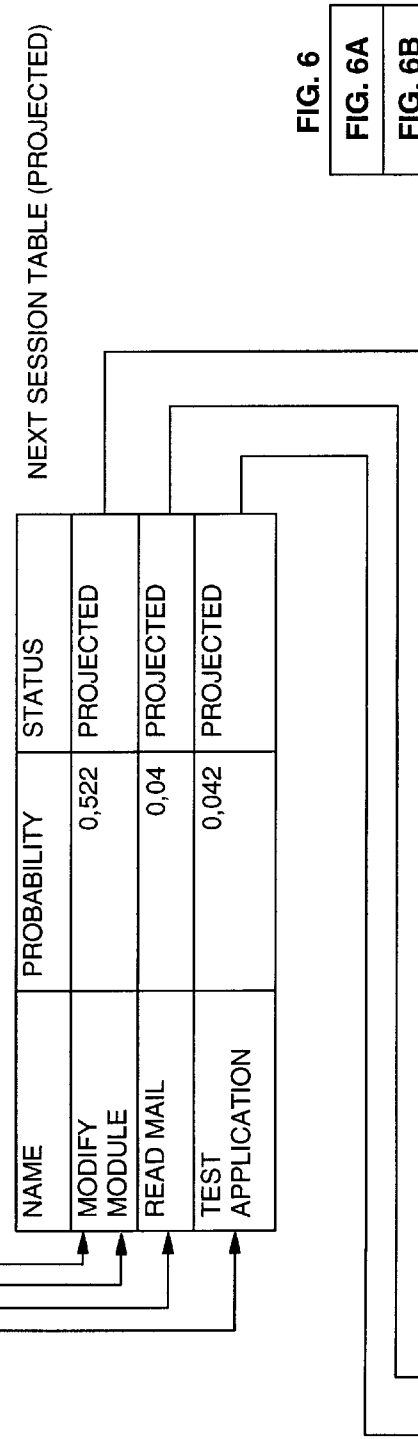

NEXT MINI TASK TABLE (ACTIVE & PROJECTED)

| NAME | PROBABILITY | PROLOGUE | EPILOGUE | SHARED RESOURCES |
|---|---|---|---|---|
| EDIT MODULE | 1 | 1 | 1 | A |
| COMPILE | 1 | 7 | 7 | B |
| LINK | 0,5 | 7 | 7 | B |
| EXECUTE APPLICATION | 0,35 | 3 | 3 | C, B |
| DOCUMENT CHANGES | 0,175 | 1 | 1 | A |

| NAME | PROBABILITY | PROLOGUE | EPILOGUE | SHARED RESOURCES |
|---|---|---|---|---|
| RETRIEVE NEW MAIL | 1 | 4 | 1 | D |
| READ MESSAGE | 0,9 | 1 | 1 | E |
| EDIT REPLY | 0,45 | 1 | 1 | A |
| SEND REPLY | 0,405 | 4 | 1 | D |

| NAME | PROBABILITY | PROLOGUE | EPILOGUE | SHARED RESOURCES |
|---|---|---|---|---|
| EXECUTE APPLICATION | 1 | 3 | 3 | C, B |
| REPEAT TEST | 0,8 | 3 | 3 | C, B |
| DOCUMENT SUCCESS | 0,2 | 1 | 1 | A |
| DOCUMENT PROBLEM | 0,72 | 1 | 1 | A |

USED RESOURCES: 0
AVAILABLE RESOURCES: 100

FIG. 6B

5,958,003

METHOD AND COMPUTER SYSTEM FOR IMPROVING THE RESPONSE TIME OF A COMPUTER SYSTEM TO A USER REQUEST

TECHNICAL FIELD

The present invention relates to the technical field of computer systems with improved response time to a user request in a computer session. More particular, the present invention provides improved response time for a client/server- configuration of Personal Computers in a network as well as for stand-alone computer systems.

BACKGROUND ART

The users of workstations use a PC as a computer dedicated to their personal work. This work is controlled by the user in dialogs he conducts in the foreground. By entering control information, the user decides what the computer should do next, in most cases working on data the user has entered on the screen. However, modern PCs running under a modern operating system like IBM OS/2 WARP can execute several strings of instructions or tasks in parallel, by switching the processing unit between tasks whenever some input/output operation, e.g. waiting for user input, can not fully utilize the power of the processor. And yet in many cases, when a user issues a request for an activity to the system, he may have to wait until the system can start the requested dialog or interaction because the requested activity requires preparatory work by the system.

OBJECTS OF THE INVENTION

It is an object of the invention to improve the response time of a computer system to a user request.

It is a further object of the invention to improve the response time for a client/server-configuration of computer systems as well as for stand-alone computer systems.

It is a further object of the invention to improve the response time while using the capability of modern Personal Computer operating systems to execute several strings of instructions in parallel.

SUMMARY OF THE INVENTION

The objects of the invention are fulfilled by the characteristics stated in enclosed independent claims. Further arrangements of the invention are disclosed in the according dependent claims.

The inventive concepts provide a 'Services Supercharger' layer of programs and information tables, exploiting the capability to start many tasks in parallel, to prepare the execution environment for one or more user sessions and actions within such user sessions, and after session termination, performs epilogue actions only when appropriate.

This supercharger layer uses some pre-information that is accumulated in the processing system about the probability that specific sessions will be started, and about the detailed activities projected to be started, both in already started sessions, and in sessions projected to be started.

The starting of sessions and of activities in sessions may require certain amounts of prologue processing that requires processing time, thus also waiting time for the user, and binds system resources that are limited and can only support the pre-execution of prologues for a limited number of sessions and activities projected for execution in the future. For some of such sessions and activities the system environment, once prepared by a prologue, can be shared by multiple sequential or simultaneous executions.

Predicting the most probable sessions and activities, and preparing them for immediate availability enables the shortest possible response from the system to the user for his requests. Predicting which sessions and activities will be used with lesser probability enables the system to execute epilogues for such sessions and activities, freeing the bound resources from such sessions and activities for the use of those with higher probability.

In a specific realization of the above inventive concepts the supercharger system automatically accumulates pre-information knowledge at two levels. Firstly the system collects knowledge about the frequency of starting specific sessions in the past. This information is submitted to an aging process, so that most recent information contributes the highest value for the probability of starting a specific session in the future. Thus the set of most probable sessions to be started in the future can be evaluated in the system dynamically for the future at each point in time.

Secondly the system collects information about activities within all sessions known to the system by their previous execution. For such sessions the sequence of activities is partly pre-defined by a workflow model of that session, as for example supported by the IBM FlowMark for OS/2 product, but further determined by user actions in each instance of executing the specific session. According to the inventive concepts, both the pre-defined activities in the workflow model, and statistically accumulated knowledge about user determined activity sequencing contribute to a concrete predictive profile for each step in a session execution, about the set of projected future activities, sorted by their probability for execution.

The inventive concepts cover the way, how such pre-information is obtained, and how the information obtained is used to optimize the use of system resources across sessions and activities in sessions, for optimizing the response time of the system to user requests.

The inventive concepts can be used both in stand-alone workstations used by a single user, and for servers used by multiple users in networking environments, consisting of multiple client workstations connected to server workstations.

As a further extension for benefitting from the implementation of the inventive concepts in a client/server configuration, the above described pre-information is collected for each user operating on a client in the network in a specific role, and is considered in the server for pre-defining resources only for those users actually active at any given instance in time, or for those users that can be projected to become active within a projection period.

Discussion of Inventive Concepts of the Workstation Services Supercharger

Personal Computers today exhibit a processing power that in most cases far exceeds the power that can be utilized by a user in his sessions. In fact in practical environments only a small percentage of the power of the processor (expressed in million instructions per second, or MIPS) is utilized. For example, OS/2 contains the Pulse feature in the operating system that lets the user observe the system utilization. Even with today's most powerful processing units the user in many sessions has to wait for the computer response for some time after he has entered his selection for the next mini-task, or activity, he wants to execute. The pulse feature lets him observe how little of the available processor power he actually utilizes in the average.

If we analyze what the processor is doing in this time, we find that the processor has to perform certain prologue functions before it can respond to a particular user request. Such prologue function may for example involve the opening of files and the loading of data and executable programs from slower access disk space to immediate access memory space. Such memory space represents a system resource available only within limits that has to be shared across all ongoing operations and those prepared for instantaneous execution. We can also observe that the system continues processing after the completion of a user request because the system has to perform some epilogue functions, conceptually un-doing the binding of system resources that were bound by the corresponding prologue. The amount of time used for such prologue and epilogue functions depends very much on the specific mini-task the user wants to execute and on the various tools involved to support the mini-task.

It is the essential concept of this invention disclosure to improve the response time of a processor to a user request by using the available idle time of the processor to prepare for the most probable next mini-tasks to be requested by the user. Pre-executing the prologue for probable next mini-tasks, sharing the prologue action, where applicable across more than one mini-task, and performing an epilogue function only when the corresponding system resources are no longer needed for one or more mini-tasks projected for the future, can reduce the response time from the system to user requests considerably. The amount of pre- executing prologues and postponing the execution of epilogues depends on the available total system resources that can be bound for projected future mini-tasks, and on the available idle time of the processor to perform such preparatory functions for mini-tasks projected for the future.

The inventive concepts in this disclosure enable this better exploitation of the available processor power for speeding up responses from the processor in user sessions, by suitably predicting future mini-tasks, evaluating both knowledge about past sessions, and looking ahead what mini-tasks will be executed next according to the workflow model interpreted in currently running and predicted future sessions, and by performing prologue actions for future mini-tasks according to their predicted future execution.

The use of the system environment established by executing a prologue for a mini-task can be shared across multiple instances of executing the mini-task, if this is logically feasible due to the characteristics of the system environment usage of the tools and functions utilized in the running of the mini-task.

A further inventive concept is the extension of the above concepts to a system configuration, where several users share the use of one processor as a server in a client-server configuration.

Realization details of the inventive concepts

Any speeding-up of the processor response to a user request which depends on the availability of information about what the user may be doing next on his processor. We can observe that in most cases it is predictable, either by logical deduction or with a certain probability derived from knowledge accumulated in the past, what session the user will be doing in the near future, and what mini-tasks he will be performing in currently running or projected future sessions.

Next Session Table

We introduce as inventive concept the 'next session table' (NSET), where we collect the information about past sessions executed by the user, and where we derive projections about the next sessions the user may be performing in the future. With the entries about sessions we maintain prologue and epilogue processing and system resource requirements information. Only such sessions will be entered in the NSET where the pre-execution of session startup prologues and of prologues for the mini-tasks in those sessions, require significant processing preparation time so that pre-execution of that preparation may contribute to system responsiveness for the user in a significant way.

Build-up of the Next Session Table

The NSET is a table that contains information about sessions previously executed by a user in a 'history section', and information derived from this history information for predicting next sessions to be executed by the user in a 'projected sessions' section.

The history section of the next session table contains the list of all sessions started by the user in the past, and associated with an aging factor. This aging factor will be decided and applied automatically by the 'Next Session Table Administrator' introduced below. The information about past sessions also contains the elapsed time of activeness for each session, that means the time between execution of the prologue and execution of the epilogue, which decides about the amount of system resource utilization in time by that session.

The projected session section of the NSET contains the projection of the most probable sessions to be started in the future, using the information about sessions executed in the past and their aging factor. In this projection it will be considered, which sessions with multiple executions in the past are capable of sharing one and the same set of system resources bound by the epilogue. For these multiple sessions in the past, only one corresponding entry will be made in the future section, but with an upgraded probability according to the multiple predicted executions for the future. The table for each session also identifies prologues, represented as specific mini-tasks required for starting a specific session, also specifying the portion of system resources bound by those mini-tasks from prologue through epilogue for each distinct session execution, or for all shared executions, if applicable.

The Next Session Table Administrator (NSETA)

The next session table administrator, according to the inventive concepts, maintains the entries in the NSET. For each session executed by the user, the NSETA enters the session information, as discussed above, into the history section of the table. Before entering sessions into the table, those sessions are eliminated that require negligible prologue and epilogue processing time, and/or only bind an insignificant amount of system resources during the session. For all other sessions types their instances of execution are accumulated. Each instances is associated with an aging factor that is assumed as 'one' for the most recent session, 'zero' for a session executed earlier than before a predefined 'aging period', and values in between for sessions within the predefined aging period. All entries that are affected by an aging factor 'zero' are deleted from the table. All entries for a specific session type are replaced by one single entry, with an aging factor ass the sum of all aging factors from the instances, but limited at the maximum value of 'one'. The 'aging period' is dynamically set by the NSETA according to the period in which a pre-defined maximum set of sessions has been recorded. Thus with low utilization of the system by the user the aging period for recorded sessions will be longer.

Next Mini-Task Table

We introduce as next major inventive concept the 'next mini-tasks table' (NMTT), and the functions maintaining information in that table. The NMTT contains information about the projection which mini-tasks the user will execute next in his currently active sessions, and in those sessions that he will start in the future with high probability, as listed in the NSET. The action of starting a specific new session is also listed as a mini-task in that table. For each of these mini-tasks it must be known what execution time is needed for prologue and epilogue for the mini- task, enabling and disabling the respective mini-task for instantaneous response to the user, and what part of the system resource distributable across all prologued mini-tasks is bound by the prologue and freed by the epilogue for each specific mini-task. The kind of system resource shared across execution-enabled mini-tasks may vary across different processor system environments, but in each case will comprise the part of memory bound by an enabled mini-task.

Build-up of the Next Mini-Tasks Table

The NMTT contains information about the set of mini-tasks that are projected to be executed by the user in the future. This table has two sections, the active session section and the projected session section.

The 'active session' section contains a projection for all mini-tasks that are projected to be started by the user in already active sessions. For various reasons the user may have several sessions started simultaneously, whereby at any instance in time he may even execute mini-tasks in more than one session. The entries in this section are dynamically updated with the progress of execution of active sessions.

The 'projected sessions' section contains a projection for all mini-tasks that are projected to be started when the projected session itself is started by the user. Once one of these sessions is actually started, the entries from this section are transferred to the active session section.

The Next Mini-Tasks Table Administrator (NMTTA)

The NMTTA represents the inventive concept how information about mini- tasks can be collected, maintained, and applied to prepare a processor for the highest responsiveness to user requests for starting sessions and for work within sessions.

Maintaining the 'active session' section of the NMTT

User sessions are in most cases not a random execution of user selected mini-tasks, but follow a logical pattern. Let us call a non-random user session that involves some logic of sequencing mini-tasks, a session application. Such a session application is always defined in some form for each instance of session application execution. For looking ahead for future mini-tasks to be executed in a session application, a workflow view of the process executed in the session application is most suitable.

Let us assume a workflow process defined by means of the IBM FlowMark workflow manager as one characteristic example of such a session application. The workflow process is represented as a process model and contains complete information about which activities are to be executed in the process, and about the decision points where more than one successor activity could alternatively be executed after a navigation decision. Such workflows can be quite short, in the extreme containing only one activity, or can go over an extended period of time, even months and years, containing many activities, or mini-tasks in the terminology of this disclosure.

It is one of the purposes of the NMTTA to load the active sessions section of the NMTTA with the set of all those mini-tasks that can be projected as next to be executed, by the current state of processing of the workflow model of the session application, for all currently active sessions.

The entries for mini-tasks, corresponding to activities defined in the workflow model, for supporting an optimal prologue and epilogue execution and associated resource binding and releasing will have to contain additional attributes. These attributes define the processor time needed for prologue and for epilogue execution, and the part of system resources bound by the prologue for the period until epilogue completion.

One very important aspect is the registration, whether the pre-execution of mini-tasks uses a system environment and resources that can be shared across mini-tasks. For example this is the case, if as part of the pre-execution a program has to be loaded and opened, but once that has been done, can be recursively invoked, that means executed multiple times in parallel without ever closing the specific program. This recursive executability is particularly implemented with many software tools, like editors, compilers and interpreters that are used both in software development and in software execution.

The NMTTA performs the following major functions for maintaining the 'active session' section of the NMTT:

for sessions with a probability between zero and one to be started, as recorded in the projected sessions section of the NMTT, it is decided according to the available and required system resources, which of these sessions should become enabled for starting, by transferring the corresponding mini-task information into the active session section of the NMTT. In loading this information, the session start probability (between one and zero) is multiplied with the probability projection for the mini-task within the session. This information is updated with every new start of a session, according to the changes in the NSET, or at system defined intervals. The initial set of mini-tasks for a session application is derived as described below.

after execution of the user function part of each mini-task, the information on the next set of mini-tasks is updated in the NMTT. This updating requires the analysis of the session application for identifying the next mini-tasks to be executed. The NMTTA analyses the workflow model of the session application at its current point of interpretation, entering the next mini-tasks in the model into the table, applying a forwards aging factor between one and zero to the projected probability for mini-tasks to be needed immediately. Those immediately following the last executed mini-task are assigned a probability of 'one', those at the end of the projection period of 'zero', the other mini-tasks correspondingly in between for mini-tasks whose resources can be shared across multiple executions, the probabilities of appearance within one session or across all active sessions are added up to a maximum probability of one remove all executed mini-tasks from the table after the epilogue processing for these mini-tasks is concluded the NMTTA continuously monitors the amount of currently bound system resources, due to executed prologues, and adjusts a limit within the projected mini-task projected probabilities below the value of one, wherever all mini-tasks with priorities in the range zero to one would exceed the usage of available system resources allocated to pre-processing mini-task prologues. This value will be used by the NMTT interpreter, described below.

The NMTTA performs the following actions for maintaining the 'projected sessions' section of the NMTT:

for each of the sessions projected in the NSET, add an entry in the 'projected sessions' section of the NMTT, modify these entries whenever the NSET changes its 'projected sessions' contents.

for each entry in the table as defined above, enter the next mini-task information, as derived from the workflow model for the session application and described above for already active sessions.

The activities of maintaining the NSET and the NMTT require compute power themselves and should only execute when the processor has compute power available, but should never impact the processor availability for user actions within started mini-tasks. In many practical examples it will even suffice to update the NSET at regular intervals, or when the number of projected sessions in the table falls below a predefined limit, and to update the NMTT only once at the beginning of a session using a session application, and then only if the number of mini-tasks with priority of one or close to one falls below a predefined limit.

Multiple users sharing a server

In the case that multiple users share one server, either multiple NSETs and NMTTs can be maintained, or the information for all users can be incorporated in shared tables. The sharing of a server by multiple users will make the application of the inventive concepts even more beneficial for improving response time to individual users, while simultaneously using a higher percentage of the available compute power. The concepts of predicting who of the users will become active in the future, and accordingly loading NSET and NMTT, can be implemented in full equivalence to the analysis defined for sessions earlier.

The Next Mini-Tasks Table Interpreter

The NMTT Interpreter (NMTTI) is a service function that is invoked whenever the user wants to execute a mini-task, and whenever he wants to terminate a mini-task.

- whenever the user wants to start a mini-task for starting a session application, or a mini-task within such an application, NMTTI responds to the user immediately if the prologue for the requested mini-task has already been executed, or starts the specific prologue. NMTTI takes care of the situation where the system resources bound by a prologue can be shared across several instances of executing the mini-task.
- whenever the user terminates the mini-task, the NMTTI is invoked to inspect whether a prologue for a not shareable, or no longer required mini-task can be executed and then executes this prologue.
- the NMTTI continuously monitors the status of the NMTT and executes those prologues that are required with the highest probability, and executes epilogues for those mini-tasks that have the lowest probability, or which have to be executed in order to free system resources needed for the execution of mini-tasks with high probability for execution.

Building Up Mini-Task Execution Knowledge

It is a pre-requisite for the concepts explained above, that for mini-tasks the prologues and epilogues, as well as their shareability across mini-tasks are well defined, so that decisions about their execution can be made by the NMTTA and NMTTI, using the NSET and NMTT.

In practical sessions, as will also be explained in the example, this situation is quite frequently given today. Thus in many cases where mini-tasks involve the preparation of certain resources (for example, opening of an interpreter type of function, like in the case of mini-tasks written in SmallTalk), or where mini-tasks require the establishment of access paths to data resources (for example, opening files or databases), this preprocessing can be done before the specific mini-task executes the interpretation of user entered information.

In a complementary inventive implementation of the NMTTA, the build-up of the information in the NMTT is achieved through an additional knowledge acquisition system. The inventive system contains an additional session knowledge table, where for each user session application and for each mini-task execution statistics are collected, registering for each type of session application for each execution instance, which mini-tasks are executed during a session instance and what the sequence of mini-tasks is in the execution instance. The information about successor mini-tasks from every given mini-task is accumulated over multiple sessions and evaluated into a probability measure for the successor to each mini-task. In this way sessions can be evaluated for services supercharging in cases where information about future mini-tasks is not as readily derivable as in the case of a FlowMark process model, but still pre-execution for mini-tasks is possible according to aggregated knowledge about the probability of future mini-tasks in the NMTT.

One implementation aspect remains to be discussed: how the pre and post-execution information, as well as system resource requirement information can be entered into the NMTT in a way supported consistently by many tools and session applications. In an implementation in support of the inventive concepts a standardized data layout should be provided, in which various tools and functions could record such information manually through a registration dialog interface, or automatically through an application programming interface. Knowledge about mini-tasks could be accumulated from multiple executions of such tasks and could also become part of the distribution information for such functions at their installation to a PC system.

The described concepts realize a solution where the possibility of executing multiple tasks in parallel in a system like OS/2 can be exploited to reduce the response time for individual user requests against the system considerably. These concepts can be applied to stand-alone user workstations and in client/server environments.

DESCRIPTION OF AN EMBODIMENT OF THE INVENTION

FIGS. 1a to 1c show three exemplary computer sessions provided by a computer system FIGS. 2 to 6 show the contents of tables related to the computer sessions of FIGS. 1a to 1c in five consecutive points in time FIGS. 1a to 1c show three exemplary computer sessions: Modify Module, Test Application and Read Mail. Each session includes one or more Mini Tasks (MT). A path between two successive MTs has an associated probability which are all shown in FIGS. 1a to 1c.

FIGS. 2 to 6 shown a History section of a Next Session Table (NSET), a Projection section of the NSET and a Next Mini Task Table (NMTT).

Figure 2B:
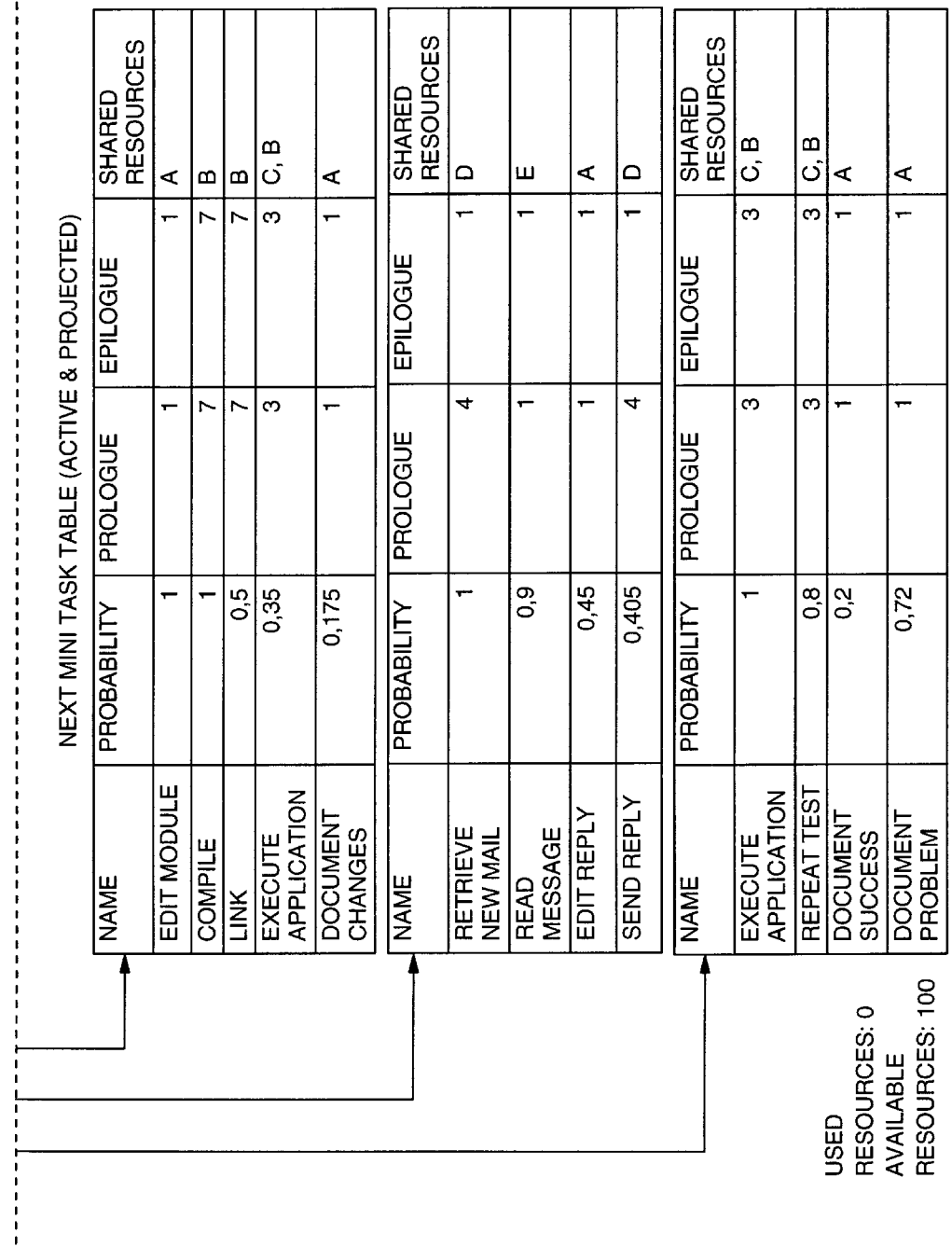

The History section of the NSET of FIG. 2 contains the three sessions of FIGS. 1a to 1c: Modifying a Module, Testing an Application and Reading Mail. In the period of time described in this table (it lasts for 500 time units) Modifying a Module has been executed several times. An Aging factor of 1 indicates that the session has been executed recently, a factor of almost zero is assigned to sessions executed at the beginning of the period. The Prologue column represents the number of time units needed for initializing the session. The Execution Time column shows how long the session was running and the Epilogue column indicates the time needed to clean up after the session has been executed. Finally the Resource column shows the average system resource utilization in percentage.

For each type of session contained in the History section an entry in the Projection section of the NSET is computed, as shown in FIG. 2. Consequently this table contains three entries: Modifying a Module, Testing an Application and Reading Mail. For each type of session the probability to be started as well as the current status of this session is stored. In this example, only one session type can be concurrently active. The probability to be started can be computed with any appropriate algorithm. However, in this example the following simple formula has been used. For each entry in the History section the following probability is computed: (Aging * Execution Time)/ Length of Period. The probability of the session type is the sum of the probabilities of all instances executed in the respective period. Each entry in this table references the Next Mini Task Table of FIG. 2

The NMTT of FIG. 2 contains all MTs that might be executed during a particular session. For each MT an execution probability is computed that indicates the probability that this MT will be executed next. This probability depends on the current state of the session. The probability of a MT is computed by multiplying the probability of the previous MT with the probability that the MT in question is executed after the previous MT. These probabilities are shown in FIG. 1. Consequently the first MT to be executed always has a probability of 1. The probability of the following MTs is decreasing. In addition the prologue and epilogue time as well as the needed system resources are stored for each MT.

In the initial state of FIG. 2 no session is active and therefore no system resources are used. In this situation the Next Session Table Administrator (NSETA) starts evaluating the History section of the NSET. First the Aging factor of all sessions is reduced by 0.1 and those sessions whose Aging factor becomes zero are removed from the History section. Then the probabilities of the Projection section are recomputed according to the new Aging factors. The results are shown in the NSET of FIG. 3.

Figure 3B:
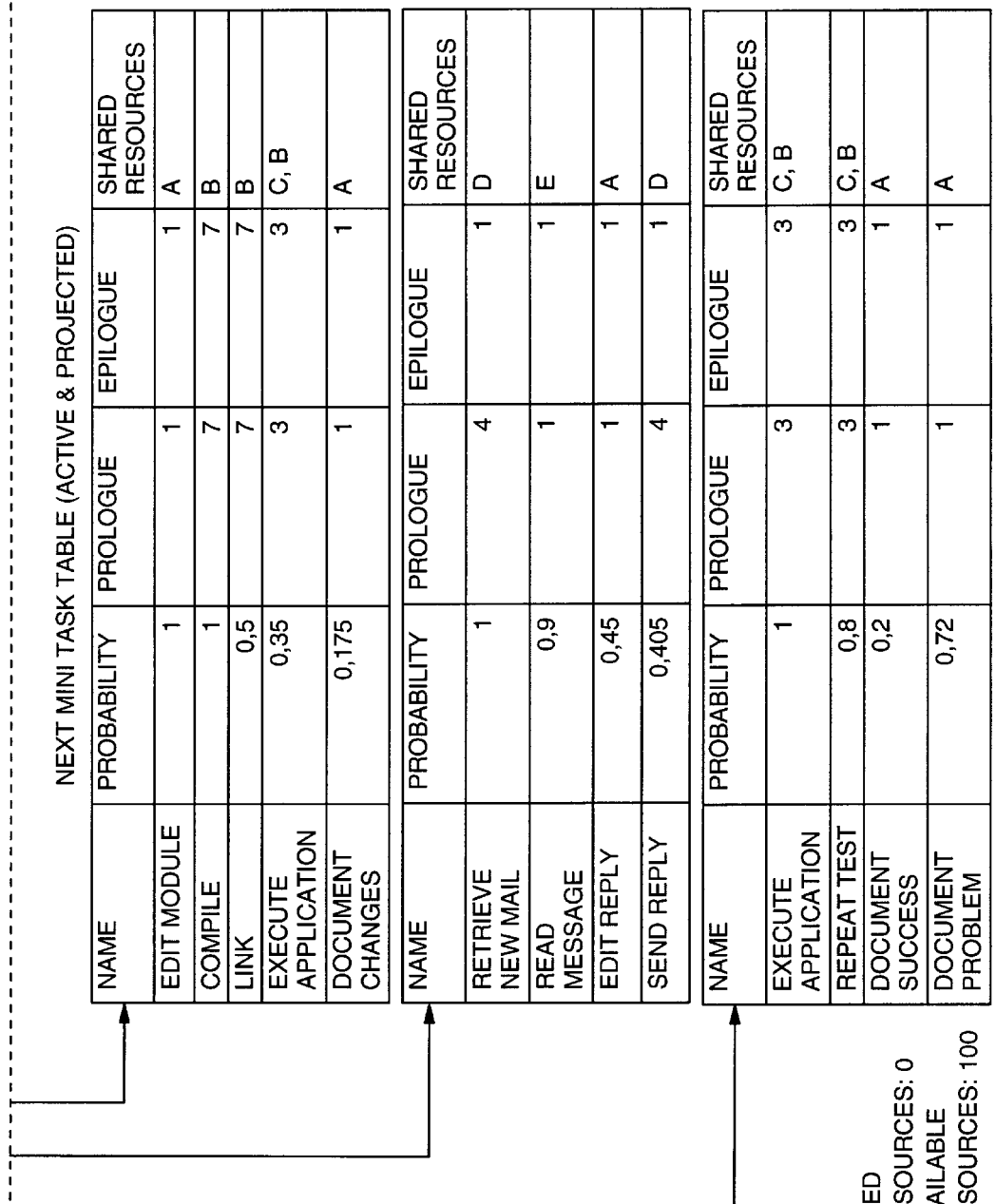

Then, according FIG. 3, the NSETA selects the session with the highest probability from the Projection section of the NSET, Modify a Module, and compares the average resource requirements with the current resource utilization. If there were not enough resources left, the session with the next smaller probability (Read Mail) would be selected. In our case of FIG. 3 there are enough resources available to activate the session, Modify Module. For this purpose the prologue of the session is executed and the session is marked active, see Projected section of NSET in FIG. 3.

In this situation of FIG. 3 the Next Mini Task Table Administrator (NMTTA) evaluates the now active NMTT. As the first two MTs of this active NMTT have a probability of 1 and enough resources are available the respective prologues are executed. This reduces the amount of available system resources to 10 percent as shown in FIG. 4. If the end user actually starts these activities, the prologue has already been executed and the necessary resources are allocated. When the end user has finished executing these MTs, the NMTTA re-calculates the probabilities of the remaining MTs. As the MT Compile has already been executed the probability of the MT Link is 1 as shown in FIG. 4. Then the NMTTA checks if the predicted next MTs use the same resources as the already executed ones. As this is the case the epilogue of the finished MTs is not executed because this would free the resources. Therefore they cannot be removed from the NMTT. However, their probability is set to zero in FIG. 4 to indicate that their epilogues have not been executed.

Now the next two MTs can be executed according to FIG. 4. The Link MT does not need any additional resources at all. Only for the MT Execute Application resource C has to be allocated. After the MT Execute Application has finished, the NMTTA again re-calculates the probabilities in the NMTT. In addition it checks for all MTs with a probability of zero if their resources are no longer needed. This is the case for resource B and C so that the epilogues of the MTs Compile, Link and Execute Application are executed by the NMTTA. As a consequence only the epilogue of MT Edit Module is not executed and resource A is still allocated. This result is shown in FIG. 5.

After the last MT Document Change has been executed by the end user, the epilogues of the first MT (Edit Module) and the last MT (Document Change) are executed because resource A is no longer needed. As the whole session is finished, it is stored in the History section of the NSET of FIG. 6. The aging factor is set to 1 as it has just finished. The other information stored in the table may be retrieved from some kind of log file. The status of the session in the Projected section of the NSET of FIG. 6 has to be reset to 'projected' and the NMTTA has to create a new NMTT for this projected session. Now the NSETA can re-evaluate the NSET. The Aging factors are reduced again and for the computation of the probabilities the currently finished session has to be considered, as described in connection with FIG. 3.

We claim:

1. A method for improving the response time of a computer system to subsequent user requests to execute tasks, said tasks having been executed in the past, said method comprising the steps of:

determining for each of said tasks a value associated with executing respective prologue processes before the respective task is requested for execution again, said value being greater for tasks which were more recently executed and incurred greater execution time than for other tasks which were less recently executed or incurred less execution time; and before said user requests to execute again the task which has the highest value and for which there are sufficient resources available to execute the respective prologue processes, executing said respective prologue processes for said task which has the highest value and for which there are sufficient resources available to execute said respective prologue processes.

2. A method as set forth in claim 1 wherein each of said tasks comprises a respective plurality of mini-tasks, said method further comprising the step of:

before there is said user request to execute again said task which has the highest value and for which there are sufficient resources available to execute said respective prologue processes, executing other prologue processes for respective mini-tasks which have a high probability of being executed if and when said user requests to execute again said task which has the highest value and for which there are sufficient resources available to execute the first said respective prologue processes.

3. A method as set forth in claim 1 further comprising the step of:

before said determining step, recording information indicating when said tasks were executed in the past and the time incurred in executing said tasks in the past.

4. A method as set forth in claim 1 wherein the value for each of said tasks is based on the product of the execution time incurred for said each task and the inverse of the elapsed time since said each task was last executed.

5. A method as set forth in claim 1 further comprising the steps of:

said user requesting said task which has the highest value and for which there are sufficient resources available to execute said respective prologue processes; and said computer system responding to said user request by executing the requested task.

6. A computer system for improving the response time to subsequent user requests to execute tasks, said tasks having been executed in the past, said system comprising:

means for determining for each of said tasks a value associated with executing respective prologue processes before the respective task is requested for execution again, said value being greater for tasks which were more recently executed and incurred greater execution time than for other tasks which were less recently executed or incurred less execution time; and means, active before said user requests to execute again the task which has the highest value and for which there are sufficient resources available to execute the respective prologue processes, for executing said respective prologue processes for said task which has the highest value and for which there are sufficient resources available to execute said respective prologue processes.

7. A system as set forth in claim 6 wherein each of said tasks comprises a respective plurality of mini-tasks, said system further comprising:

means, active before there is said user request to execute again said task which has the highest value and for which there are sufficient resources available to execute said respective prologue processes, for executing other prologue processes for respective mini-tasks which have a high probability of being executed if and when said user requests to execute again said task which has the highest value and for which there are sufficient resources available to execute the first said respective prologue processes.

8. A system as set forth in claim 6 further comprising:

means, active before said determining means, for recording information indicating when said tasks were executed in the past and the time incurred in executing said tasks in the past.

9. A system as set forth in claim 6 wherein the value for each of said tasks is based on the product of the execution time incurred for said each task and the inverse of the elapsed time since said each task was last executed.

10. A system as set forth in claim 6 wherein said user requests said task which has the highest value and for which there are sufficient resources available to execute said respective prologue processes, and further comprising means, responsive to said user request, for executing the requested task.

11. A computer program product for improving the response time of a computer system to subsequent user requests to execute tasks, said tasks having been executed in the past, said computer program product comprising:

a computer readable medium;

first program instruction means for determining for each of said tasks a value associated with executing respective prologue processes before the respective task is requested for execution again, said value being greater for tasks which were more recently executed and incurred greater execution time than for other tasks which were less recently executed or incurred less execution time; and second program instruction means active before said user requests to execute again the task which has the highest value and for which there are sufficient resources available to execute the respective prologue processes, for executing said respective prologue processes for said task which has the highest value and for which there are sufficient resources available to execute said respective prologue processes;

and wherein said first and second program instruction means are recorded on said medium.

12. A computer program product as set forth in claim 11 wherein each of said tasks comprises a respective plurality of mini-tasks, said method further comprising:

third program instruction means, active before there is said user request to again execute said task which has the highest value and for which there are sufficient resources available to execute said respective prologue processes, for executing other prologue processes for respective mini-tasks which have a high probability of being executed if and when said user again requests to execute said task which has the highest value and for which there are sufficient resources available to execute the first said respective prologue processes; and wherein said third program instruction means is recorded on said medium.

13. A computer program product as set forth in claim 11 further comprising:

third program instruction means, active before said determining step, for recording information indicating when said tasks were executed in the past and the time incurred in executing said tasks in the past; and wherein said third program instruction means is recorded on said medium.

14. A method as set forth in claim 11 wherein the value for each of said tasks is based on the product of the execution time incurred for said each task and the inverse of the elapsed time since said each task was last executed.

15. A method as set forth in claim 11 wherein said user requests said task which has the highest value and for which there are sufficient resources available to execute said respective prologue processes, and further comprising third program instruction means for responding to said user request by executing the requested task, and wherein said third program instruction means is recorded on said medium.

* * * * *